United States Patent
Kim et al.

(10) Patent No.: US 12,397,806 B2
(45) Date of Patent: Aug. 26, 2025

(54) AUTONOMOUS VEHICLE CHASSIS FRAME ESTIMATION BY MINIMIZING DISTORTION FROM CAD MODEL

(71) Applicant: GM Cruise Holdings LLC, San Francisco, CA (US)

(72) Inventors: Hyungjin Kim, Campbell, CA (US); Adria Serra Moral, Oakland, CA (US); Ankit Rohatgi, Pacifica, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 546 days.

(21) Appl. No.: 17/858,831

(22) Filed: Jul. 6, 2022

(65) Prior Publication Data
US 2024/0010213 A1    Jan. 11, 2024

(51) Int. Cl.
*B60W 50/06* (2006.01)
*B60W 60/00* (2020.01)
*G01C 21/28* (2006.01)
*G01C 25/00* (2006.01)

(52) U.S. Cl.
CPC .......... *B60W 50/06* (2013.01); *B60W 60/001* (2020.02); *G01C 21/28* (2013.01); *G01C 25/00* (2013.01)

(58) Field of Classification Search
None
See application file for complete search history.

(56) References Cited

U.S. PATENT DOCUMENTS

| | | | |
|---|---|---|---|
| 7,337,650 B1 * | 3/2008 | Preston | G01P 15/02 73/1.38 |
| 9,719,801 B1 * | 8/2017 | Ferguson | G01C 21/3602 |
| 10,785,474 B1 * | 9/2020 | Semansky | G06V 20/56 |
| 2010/0318307 A1 * | 12/2010 | Schommer | G01B 11/27 73/1.79 |
| 2012/0290169 A1 * | 11/2012 | Zeng | G01S 7/4972 701/30.2 |
| 2014/0368651 A1 * | 12/2014 | Irschara | G06T 7/80 348/148 |
| 2017/0124781 A1 * | 5/2017 | Douillard | G08G 1/207 |

* cited by examiner

*Primary Examiner* — Lina Cordero
(74) *Attorney, Agent, or Firm* — CANTOR COLBURN LLP

(57) ABSTRACT

The subject disclosure relates to estimating a chassis frame of an autonomous vehicle. A process of the disclosed technology can include receiving a position for each of a plurality of sensors on an autonomous vehicle, determining an ideal chassis point in relation to a constellation of model sensors in a CAD model associated with the autonomous vehicle, generating a constellation of the plurality of sensors based on the positions of the plurality of sensors in relation to the ideal chassis point, minimizing distortion between measured values associated with the constellation of the plurality of sensors and ideal values associated with the constellation of model sensors, determining an estimated real chassis point based on the minimized distortion between the measured values and the ideal values, and calibrating at least one of the plurality of sensors based on the estimated real chassis point.

20 Claims, 5 Drawing Sheets

AUTONOMOUS VEHICLE CHASSIS FRAME ESTIMATION BY MINIMIZING DISTORTION FROM CAD MODEL

TECHNICAL FIELD

The subject technology provides solutions for estimating a chassis frame of an autonomous vehicle, and more particularly, to estimating a chassis frame of an autonomous vehicle by minimizing distortion between measured values of sensors on the autonomous vehicle and values of model sensors in a CAD model.

BACKGROUND

An autonomous vehicle is a motorized vehicle that can navigate without a human driver. An exemplary autonomous vehicle includes a plurality of sensor systems, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

Figure 1:
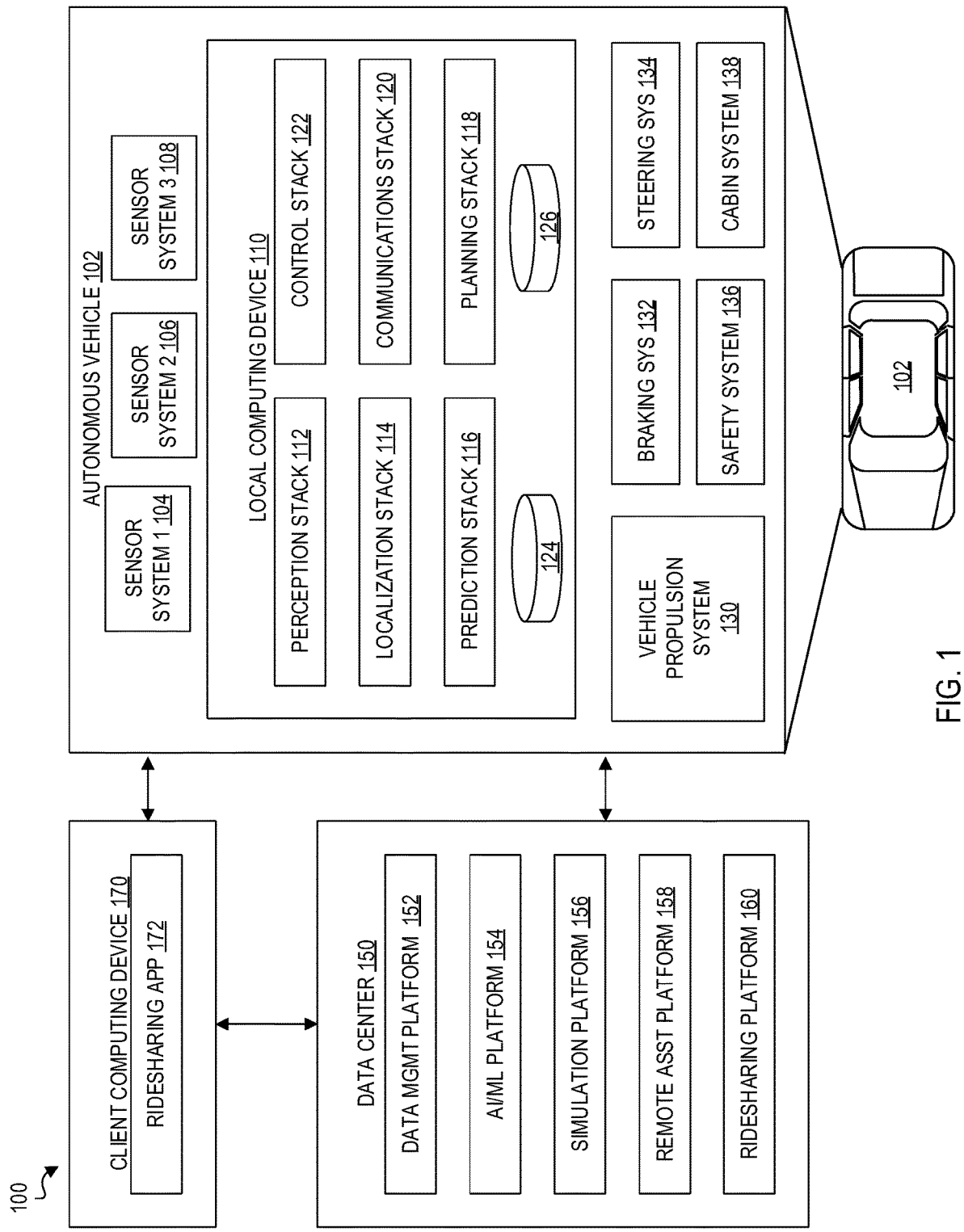
FIG. 1 illustrates an example of a system for managing one or more Autonomous Vehicles (AVs) in accordance with some aspects of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

As discussed above, an autonomous vehicle is a motorized vehicle that relies heavily on various sensors. As more autonomous vehicles are manufactured, there is an exponential need for calibration of these sensors. Generally, sensors of autonomous vehicles are calibrated in well known environments or facilities. However, as the number of autonomous vehicles keep increasing, these facilities may not have enough capacity to calibrate at the same rate as the autonomous vehicles are manufactured.

These facilities are typically used because the facilities are heavily controlled specifically for calibrating sensors. For example, the facilities may be heavily mapped and/or tagged, such that technicians calibrating the sensors know exactly the correct position/placement, orientation, and alignment of each sensor on each autonomous vehicle. Additionally, technicians may not be readily available at all times.

Thus, there is a need in the art for calibrating sensors of an autonomous vehicle without a structured or specific facility and without excessive human intervention. However, enabling autonomous vehicles to self-calibrate sensors still poses many challenges. Especially in unstructured environments, there are many unknown variables that can affect sensor calibration. One such variable is sensor positioning after manufacturing. The positions and orientations of each sensor can be used to determine a chassis frame or point on the autonomous vehicle.

The chassis frame or chassis point is an imaginary point on a rigid body that is used to orient various axes of the autonomous vehicle. For example, one such chassis point can be the center of the rear axle of the autonomous vehicle. From this chassis point, a first axis (e.g., an x-axis) can be defined along a length of the autonomous vehicle, a second axis (e.g., a y-axis) can be defined along a width of the autonomous vehicle, and a third axis (e.g., a z-axis) can be defined along a height of the autonomous vehicle.

Although all sensors are mounted on a rigid body, none of the sensors can accurately measure sensor-to-body transformation. Thus, orientation biases among sensors could impair the alignment of sensor locations. Additionally, sensor placement and/or orientation on each vehicle may not be exactly the same between or among vehicles. Thus, if sensor placement and/or orientation is significantly different from an ideal case (e.g., a CAD model), then the determination of the chassis frame or point may become distorted. If the position and/or orientation of any reference sensor is really distorted, then determined chassis point may not be ideal, which could have safety implications.

This distortion is further complicated by other factors. For example, sensor position and orientation may actually be accurate, but an environment that the autonomous vehicle is in may not be ideal. For example, the autonomous vehicle may actually be on a slight incline, such that the sensor-to-sensor links are distorted along one axis. This can cause the autonomous vehicle to perceive all of the sensors as distorted from the ideal case, when in reality the sensor placements are accurate and precise. Other factors can also include sprung mass conditions, tire and/or wheel radii, road grade, etc.

Depending on manufacturing methods, translation biases can have consistent results. For example, sensors can be installed by twisting (e.g., changing orientation) but without moving (e.g., changing position or placement). Thus, the present technology provides solutions for an improved chassis frame and/or point estimation by minimizing distortion between measured values obtained from the sensors of the autonomous vehicle and values from the CAD model. In other words, the present technology can estimate a chassis point and/or frame by minimizing distortion sensor positions of real, measured values and the CAD values. In some embodiments, the autonomous vehicle can minimize distortion between the measured values and the CAD values by utilizing a least-squares method regression on the CAD values (or positions, orientations, and/or pose) and the real, measured values (or positions, orientations, and/or poses) of the sensors on the autonomous vehicle. In some embodiments, the autonomous vehicle can determine the chassis point by using various constraints, such as a generating a convex hull and requiring the chassis point to be within the polygon generated by the convex hull, a symmetry and/or bilateral symmetry constraint, a distance constraint based on a distance from the ideal chassis point, etc.

FIG. 1 illustrates an example of an autonomous vehicle (AV) management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., light detection and ranging (LIDAR) systems, ambient light sensors, infrared sensors, etc.), RADAR systems, global positioning system (GPS) receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and a high definition (HD) geospatial database 126, among other stacks and systems.

Additionally, local computing device 110 can be configured to calibrate one or more sensors of sensor systems 104-108. For example, local computing device 110 can receive sensor information and measurements, which can indicate a measured direction and position. Additionally, local computing device 110 can determine sensor-to-sensor distances and directions. In other words, local computing device 110 can understand where sensors are positioned in relation to other sensors. Local computing device 110 can also estimate a chassis point by referencing at least one of sensor systems 104-108. The estimate can be refined using constraints, such as a convex hull defined by positions of sensor systems 104-108 and/or symmetrical constraints. In some embodiments, an ideal chassis point is located at a center of a rear axle of autonomous vehicle 102. Once the chassis point is estimated and/or determined, a chassis frame can be generated. A chassis frame is a coordinate system that defines various axes in relation to the chassis of autonomous vehicle 102. The purpose of the chassis frame is generally to describe location, orientation, and/or motion of autonomous vehicle 102 in relation to a local earth fixed navigation frame, such as the Universal Transverse Mercator Coordinate System, in which the x-axis points East, the y-axis points North, and the z-axis points up. On the other hand, the chassis frame can have an x-axis along a length of autonomous vehicle 102, a y-axis along a width of autonomous vehicle 102, and a z-axis along a height of autonomous vehicle 102. Local computing device 110 can then calibrate sensor systems 104-108 based on the chassis frame.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the perception stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, among other systems.

The data management platform 152 can be a "big data" system capable of receiving and transmitting data at high velocities (e.g., near real-time or real-time), processing a large variety of data and storing large volumes (e.g., terabytes, petabytes or more) of data. The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Figure 2:
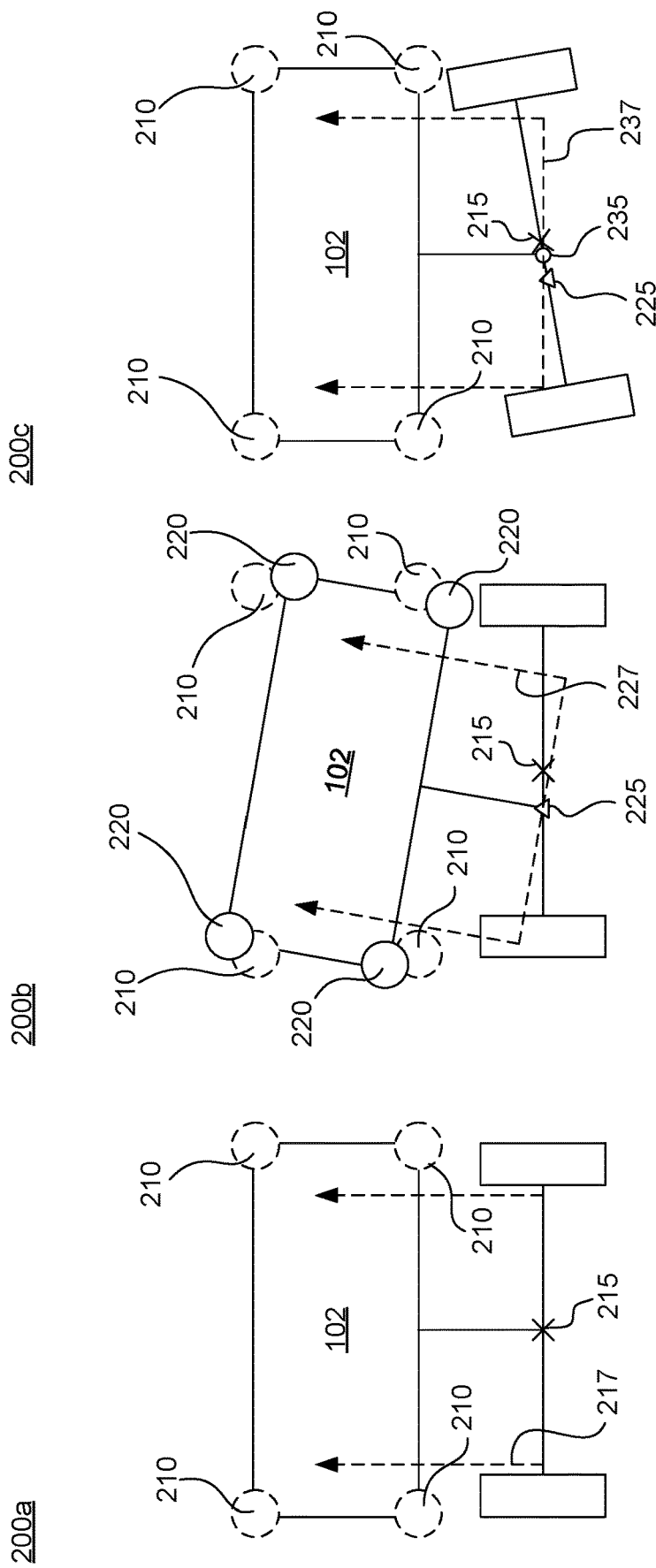
FIG. 2A illustrates an ideal environment having an autonomous vehicle in accordance with some aspects of the present technology.
FIG. 2B illustrates an example environment perceived by an autonomous vehicle in accordance with some aspects of the present technology.
FIG. 2C illustrates an environment processed by an autonomous vehicle in accordance with some aspects of the present technology.

FIG. 2A illustrates an ideal environment 200a having a model autonomous vehicle 102. In some embodiments, the ideal environment 200a is a virtual environment having a CAD model of and/or associated with the autonomous vehicle 102 shown in FIG. 1. In some embodiments, the ideal environment 200a is a CAD model 200a including model autonomous vehicle 102. The model autonomous vehicle 102 associated with the CAD model 200a has various model sensors 210 that are positioned in various locations on a frame of the model autonomous vehicle 102. In CAD model 200a, model autonomous vehicle 102 has an ideal chassis point 215 that is estimated based on model sensors 210. Ideal chassis point 215 is then used to generate and/or determine the chassis frame or axes 217 of the chassis frame. However, as discussed above, an autonomous vehicle has many dynamic elements, such as tire radii, sprung mass, location, road grade, etc.

FIG. 2B illustrates an example environment 200b perceived by autonomous vehicle 102. Autonomous vehicle 102 has various sensors 220 (e.g., sensor systems 104-108 as discussed above with reference to FIG. 1) positioned in various locations on a frame of autonomous vehicle 102. In environment 200b, autonomous vehicle 102 perceives, based on sensors 220, a perceived chassis point 225. FIG. 2B further illustrates where the model sensors and the ideal chassis point 215 would be located. In other words, FIG. 2B illustrates a difference between an ideal case and an actual or perceived case. The difference between the ideal case and the perceived case may be due to various factors. For example, autonomous vehicle 102 may be assuming that sprung mass and tire radii are at ideal conditions during calibration, but the reality may be that the sprung mass and tire radii are not at ideal conditions, which causes the difference. This can result in improper estimation of the chassis frame. For example, axes 227 of the chassis frame determined based on perceived chassis point 225 may be misaligned with accurate axes of the chassis frame. For example, accurate axes of the chassis frame can include a first axis (e.g., an x-axis) defined along a length of the autonomous vehicle and/or parallel to the ground, a second axis (e.g., a y-axis) defined along a width of the autonomous vehicle and/or parallel to the ground, and a third axis (e.g., a z-axis) defined along a height of the autonomous vehicle and/or orthogonal to the ground.

FIG. 2C illustrates an environment 200c processed by autonomous vehicle 102. For example, environment 200c can be the same environment as environment 200b, after autonomous vehicle 102 processes and determines an estimated real chassis point 235. Estimated real chassis point 235 can be closer to ideal chassis point 215 than perceived chassis point 225 is. More specifically, autonomous vehicle 102 minimizes distortion between positions, orientations, poses, and/or values of model sensors 210 and those of real sensors 220. To minimize distortion, autonomous vehicle 102 can expect that the general shape of the sensor constellation between model sensors 210 and real sensors 220 is similar. In other words, when one sensor or process is inaccurately calibrated and perceived or measured to be distorted, the sensor, when weighted equally, may pull the calibrated chassis point away from the actual vehicle. To address this, autonomous vehicle 102 can minimize distortion by recognizing that one or more real sensors 220 are really distorted from the generally expected location and/or shape of the constellation of real sensors 220. Autonomous vehicle 102 can then assign a lower weighting to the inaccurately calibrated real sensors, so that the calibrated chassis point is kept within the constellation of real sensors 220.

In some embodiments, minimizing distortion can include estimating a sensor-to-sensor position, orientation, or pose, followed by performing the above using a model (e.g., a CAD model). In some embodiments, a factory may attempt to perform a sensor-to-sensor calibration, while another entity minimizes distortion using the sensor-to-sensor constellation as described above. In some embodiments, minimizing distortion can include model constraints (e.g., CAD distortion constraints) as part of the calibration for real sensors 220. For example, the calibration method can include a least-squares method.

After minimizing distortion, real sensors 220 are measured to be in substantially the same location as model sensors 210 with respect to autonomous vehicle 102. In some embodiments, autonomous vehicle 102 may be configured to trust and/or weight the location of model sensors 210 more than the location of real sensors 220. Furthermore, estimated real chassis point 235 is used to determine axes 237 of the chassis frame, one of which is aligned with the width of autonomous vehicle 102 and another is aligned with a height of autonomous vehicle 102. While similar to axes 227 of FIG. 2B, axes 237 of FIG. 2C illustrate an understanding by autonomous vehicle 102 that the rear axle is not aligned with the flat ground. In other words, autonomous vehicle 102 assumes the center of the rear axle may not align with the chassis frame in some conditions. Additionally, based on the understanding that the axle may not be aligned with the chassis frame, axes 237 of the chassis frame can be determined and can be localized in relation to an earth fixed navigation frame, such as the Universal Transverse Mercator Coordinate System, in which the x-axis points East, the y-axis points North, and the z-axis points up (e.g., ENU axis system).

Figure 3:
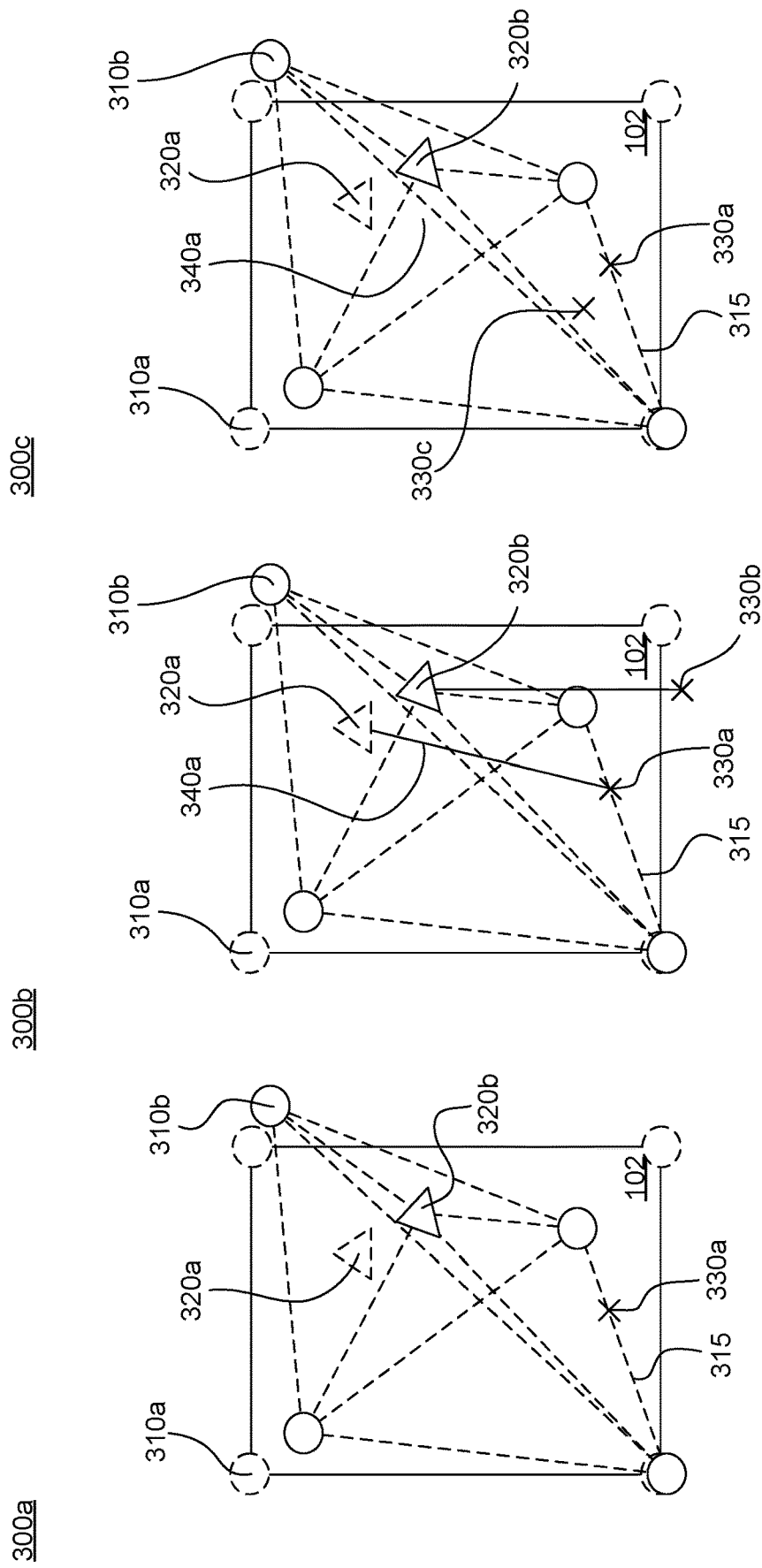
FIG. 3A illustrates a constellation of sensors of an autonomous vehicle in accordance with some aspects of the present technology.
FIG. 3B illustrates a constellation of sensors of an autonomous vehicle in accordance with some aspects of the present technology.
FIG. 3C illustrates a constellation of sensors of an autonomous vehicle in accordance with some aspects of the present technology.

FIG. 3A illustrates a constellation 300a of model sensors 310a, 320a and real sensors 310b, 320b of an autonomous vehicle 102. More specifically, model LiDAR sensors 310a are illustrated as ideal positions of LiDAR sensors on autonomous vehicle 102, while real LiDAR sensors 310b are illustrated in perceived or actual positions on autonomous vehicle 102. Model IMU sensor 320a are illustrated as ideal positions of an IMU sensor on autonomous vehicle 102, while real IMU sensor 320b is illustrated in a perceived or actual position on autonomous vehicle 102. As shown, real sensors 310b, 320b can be located differently from the ideal positions of model sensors 310a, 320a. Sensor-to-sensor links 315 between 310b, 320b can be determined based on sensor data obtained from real sensors 310b, 320b. Additionally, with various calibration processes, autonomous vehicle 102 can measure and/or calibrate sensor-to-sensor links 315. However, autonomous vehicle 102 currently are unable to accurately estimate the virtual or ideal chassis point 330a. More specifically, the chassis frame is generally estimated by referencing one of real sensors 310b, 320b. However, if any of the reference sensors (e.g., real IMU sensor 320b) that define a chassis-to-sensor distance gets distorted (e.g., moved or misoriented), then the estimated chassis point will also be displaced. For example, if the IMU board is not parallel with the chassis but at an incline, some of the dampers may get used and it may have more cushion on one side than the other, which can cause a result of having unaccounted for misalignment of the reference sensor (e.g., IMU sensor) and consequently all other calibrations therefrom. By utilizing multiple sensors as reference sensors, there is less likelihood that a majority of the sensors are misaligned. However, utilizing multiple sensors also can introduce conflicting information. Minimizing distortion of these sensors provides a robust method for fusing conflicting information, which enables usage of multiple sensors in an efficient manner.

FIG. 3B illustrates a constellation 300b of sensors 310b, 320b of autonomous vehicle 102. Based on the differences between the perceived locations of real sensors 310b, 320b and the ideal positions of model sensors 310a, 320a, autonomous vehicle 102 may determine or estimate perceived chassis point 330b, which may not be in the same location as ideal chassis point 330a. As discussed above, if a reference sensor that defines a chassis-to-sensor distance gets distorted, perceived chassis point 330b can be displaced. For example, in an ideal scenario, ideal IMU sensor 320a can have direction and distance 340a between ideal IMU sensor 310a and ideal chassis point 330a. However, real IMU sensor 320b is distorted both in position and orientation. Thus, when autonomous vehicle 102 uses the direction and distance 340a for real IMU sensor 320b, autonomous vehicle 102 estimates perceived chassis point 330b outside of autonomous vehicle 102.

FIG. 3C illustrates a constellation 300c of sensors 310b, 320b of autonomous vehicle 102 after autonomous vehicle 102 processes and determines estimated real chassis point 330c. More specifically, autonomous vehicle 102 can utilize the CAD model and all of the ideal chassis point-to-sensor distances and apply various constraints. For example, autonomous vehicle 102 can align the pre-calibrated or measured sensor-to-sensor position and/or orientation and adjust the alignment between the CAD model and the constellation of sensors 310b, 320b to find the closest fit between the CAD model and the constellation of sensors 310b, 320b. In some embodiments, autonomous vehicle 102 can generate a convex hull polygon defined by sensor placements to ensure that the chassis point remains inside the polygon defined by sensor-to-sensor links 315. As another example, autonomous vehicle 102 can minimize distortion, so that the chassis point is as close as possible to ideal chassis point 330a (e.g., the center of the rear axle of autonomous vehicle 102). As another example, autonomous vehicle 102 can apply symmetrical constraints, such that sensor placements are symmetrical.

Figure 4:
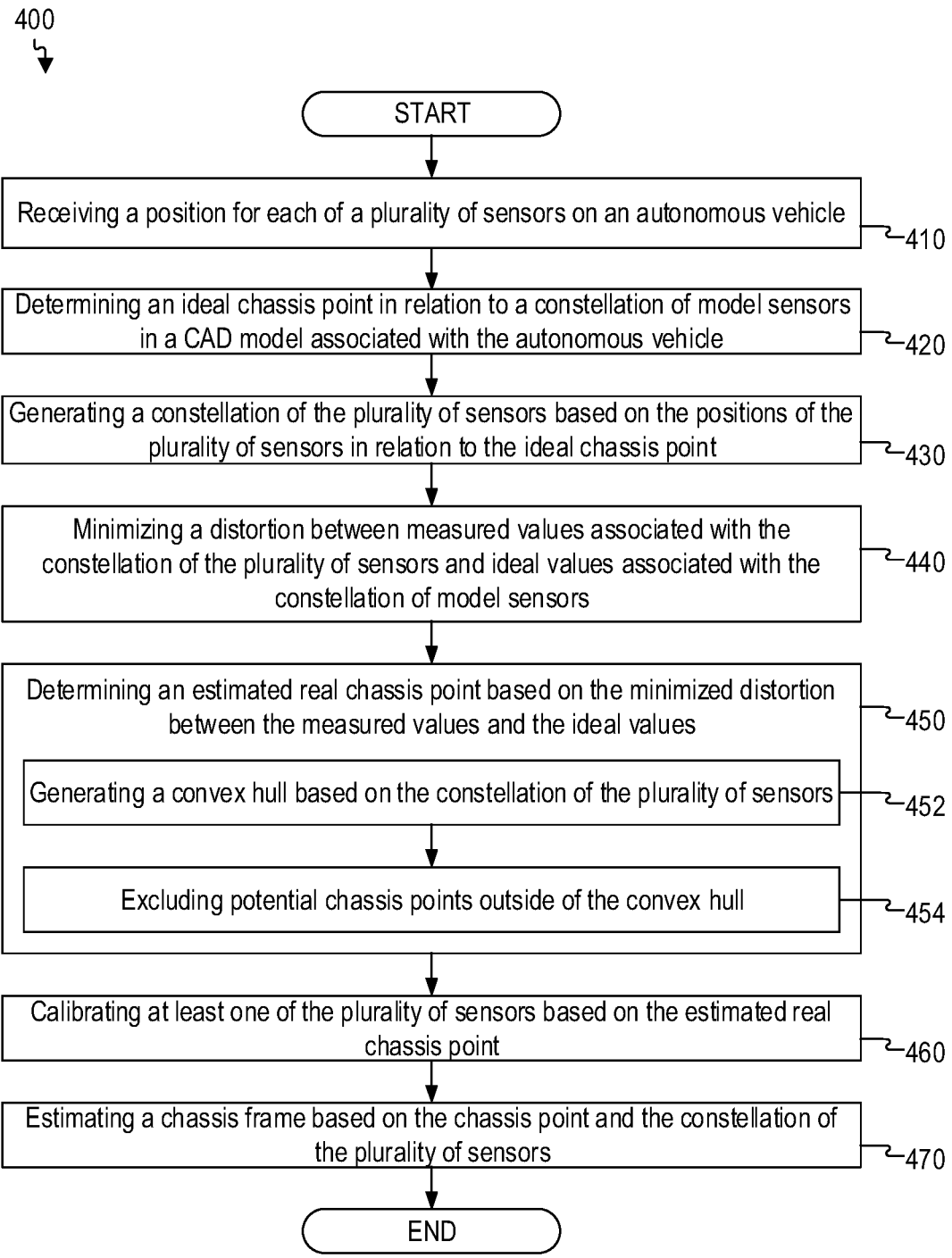
FIG. 4 illustrates an example process for estimating a chassis frame of an autonomous vehicle in accordance with some aspects of the present technology.

FIG. 4 illustrates an example method 400 for estimating a chassis frame of an autonomous vehicle. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

In some embodiments, method 400 includes receiving 410 a position for each of a plurality of sensors on an autonomous vehicle. For example, internal computing system 110 illustrated in FIG. 1 may receive 410 a position for each of a plurality of sensors on an autonomous vehicle.

In some embodiments, method 400 includes determining 420 an ideal chassis point in relation to a constellation of model sensors in a CAD model associated with the autonomous vehicle. For example, internal computing system 110 illustrated in FIG. 1 may determine 420 an ideal chassis point in relation to a constellation of model sensors in a CAD model associated with the autonomous vehicle.

In some embodiments, method 400 includes generating 430 a constellation of the plurality of sensors based on the positions of the plurality of sensors in relation to the ideal chassis point. For example, internal computing system 110 illustrated in FIG. 1 may generate 430 a constellation of the plurality of sensors based on the positions of the plurality of sensors in relation to the ideal chassis point.

In some embodiments, method 400 includes minimizing 440 distortion between measured values associated with the constellation of the plurality of sensors and ideal values associated with the constellation of model sensors. For example, internal computing system 110 illustrated in FIG. 1 may minimize 440 distortion between measured values associated with the constellation of the plurality of sensors and ideal values associated with the constellation of model sensors. In some embodiments, the measured values include distance values between the ideal chassis point and each of the plurality of sensors. In some embodiments, minimizing distortion includes utilizing a least-squares method regression on the measured values and the ideal values. In some embodiments, minimizing distortion includes applying a symmetry constraint on or for the constellation of the plurality of sensors. In some embodiments, minimizing distortion includes applying a bilateral symmetry constraint on or for the constellation of the plurality of sensors.

In some embodiments, method 400 includes determining 450 an estimated real chassis point based on the minimized distortion between the measured values and the ideal values. For example, internal computing system 110 illustrated in FIG. 1 may determine an estimated real chassis point based on the minimized distortion between the measured values and the ideal values. In some embodiments, the potential chassis points are generated based on calculated distances between the ideal chassis point and each of the plurality of sensors. In some embodiments, determining the chassis point includes identifying a center of the constellation of the plurality of sensors. In some embodiments, the chassis point is located at the center. In some embodiments, determining the chassis point includes selecting a potential chassis point from a plurality of potential chassis points. In some embodiments, the selected potential chassis point is the closest potential chassis point to the ideal chassis point.

In some embodiments, determining 450 an estimated real chassis point can include generating 452 a convex hull based on the constellation of the plurality of sensors. For example, internal computing system 110 illustrated in FIG. 1 may generate 452 a convex hull based on the constellation of the plurality of sensors.

In some embodiments, determining 450 an estimated real chassis point can include excluding 454 potential chassis points outside of the convex hull. For example, the internal computing system 110 illustrated in FIG. 110 may exclude 454 potential chassis points outside of the convex hull.

In some embodiments, method 400 includes calibrating 460 at least one of the plurality of sensors based on the estimated real chassis point. For example, internal computing system 110 illustrated in FIG. 1 may calibrate 460 at least one of the plurality of sensors based on the estimated real chassis point.

In some embodiments, method 400 includes estimating 470 a chassis frame based on the chassis point and the constellation of the plurality of sensors. For example, internal computing system 110 illustrated in FIG. 1 may estimate 470 a chassis frame based on the chassis point and the constellation of the plurality of sensors. Additionally the chassis frame can then be used and/or localized in relation to the Universal Transverse Mercator Coordinate System. Furthermore, internal computing system 110 can calibrate at least one sensor of the autonomous vehicle based on the estimated chassis frame.

Figure 5:
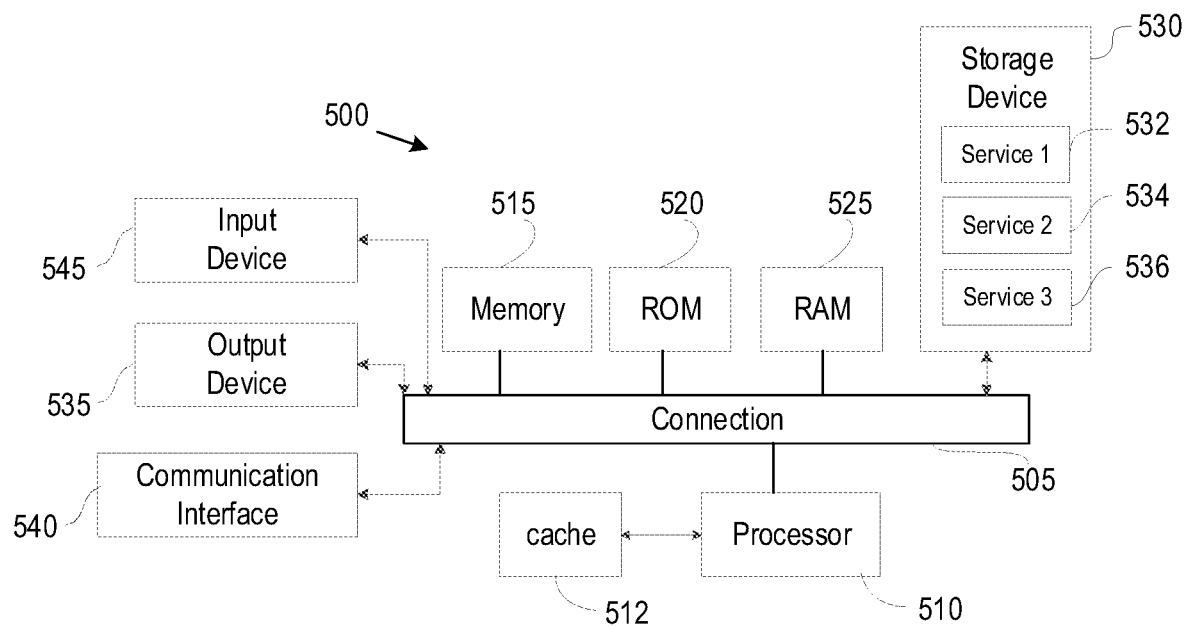
FIG. 5 illustrates environment that includes an autonomous vehicle in communication with a computing system in accordance with some aspects of the present technology.

FIG. 5 shows an example of computing system 500, which can be for example any computing device making up autonomous vehicle 102, internal computing system 110, data center 150, client computing device 170, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A computer-implemented method comprising:
   receiving a position for each of a plurality of sensors on an autonomous vehicle;
   determining an ideal chassis point in relation to a constellation of model sensors in a CAD model associated with the autonomous vehicle;
   generating a constellation of the plurality of sensors based on positions of the plurality of sensors in relation to the ideal chassis point;
   minimizing distortion between measured values associated with the constellation of the plurality of sensors and ideal values associated with the constellation of model sensors;
   determining an estimated real chassis point based on the minimized distortion between the measured values and the ideal values; and
   calibrating at least one of the plurality of sensors based on the estimated real chassis point.

2. The computer-implemented method of claim 1, wherein the measured values include distance values between the ideal chassis point and each of the plurality of sensors.

3. The computer-implemented method of claim 1, wherein minimizing the distortion includes a least-squares method.

4. The computer-implemented method of claim 1, wherein minimizing the distortion includes a symmetry constraint for the constellation of the plurality of sensors.

5. The computer-implemented method of claim 1, wherein minimizing the distortion includes a bilateral symmetry constraint for the constellation of the plurality of sensors.

6. The computer-implemented method of claim 5, wherein determining the estimated real chassis point includes identifying a center of the constellation of the plurality of sensors, wherein the estimated real chassis point is located at the center.

7. The computer-implemented method of claim 1, wherein determining the estimated real chassis point includes:
generating a convex hull based on the constellation of the plurality of sensors; and excluding potential chassis points outside of the convex hull.

8. The computer-implemented method of claim 1, wherein determining the estimated real chassis point includes selecting a potential chassis point from a plurality of potential chassis points, wherein the selected potential chassis point is a closest potential chassis point to the ideal chassis point, wherein the plurality of potential chassis points are generated based on calculated distances between the ideal chassis point and each of the plurality of sensors.

9. The computer-implemented method of claim 1, further comprising:
estimating a chassis frame based on the constellation of the plurality of sensors and either the ideal chassis point or the estimated real chassis point.

10. A non-transitory computer readable medium comprising instructions, the instructions, when executed by a computing system, cause the computing system to:
receive a position for each of a plurality of sensors on an autonomous vehicle;
determine an ideal chassis point in relation to a constellation of model sensors in a CAD model associated with the autonomous vehicle;
generate a constellation of the plurality of sensors based on positions of the plurality of sensors in relation to the ideal chassis point;
minimize distortion between measured values associated with the constellation of the plurality of sensors and ideal values associated with the constellation of model sensors;
determine an estimated real chassis point based on the minimized distortion between the measured values and the ideal values; and
calibrate at least one of the plurality of sensors based on the estimated real chassis point.

11. The non-transitory computer readable medium of claim 10, wherein the measured values include distance values between the ideal chassis point and each of the plurality of sensors.

12. The non-transitory computer readable medium of claim 10, wherein minimizing the distortion includes a least-squares method.

13. The non-transitory computer readable medium of claim 10, wherein minimizing the distortion includes a symmetry constraint for the constellation of the plurality of sensors.

14. The non-transitory computer readable medium of claim 10, wherein minimizing the distortion includes a bilateral symmetry constraint for the constellation of the plurality of sensors.

15. The non-transitory computer readable medium of claim 14, wherein determining the estimated real chassis point includes identifying a center of the constellation of the plurality of sensors, wherein the estimated real chassis point is located at the center.

16. The non-statutory computer readable medium of claim 10, wherein the non-statutory computer readable medium further comprises instructions that, when executed by the computing system, cause the computing system to:
generate a convex hull based on the constellation of the plurality of sensors; and exclude potential chassis points outside of the convex hull.

17. The non-statutory computer readable medium of claim 10, wherein determining the estimated real chassis point includes selecting a potential chassis point from a plurality of potential chassis points, wherein the selected potential chassis point is a closest potential chassis point to the ideal chassis point, wherein the plurality of potential chassis points are generated based on calculated distances between the ideal chassis point and each of the plurality of sensors.

18. The non-statutory computer readable medium of claim 10, wherein the non-statutory computer readable medium further comprises instructions that, when executed by the computing system, cause the computing system to:
estimate a chassis frame based on the constellation of the plurality of sensors and either the ideal chassis point or the estimated real chassis point.

19. A system comprising:
a storage configured to store instructions;
a processor configured to execute the instructions and cause the processor to:
receive a position for each of a plurality of sensors on an autonomous vehicle; determine an ideal chassis point in relation to a constellation of model sensors in a CAD model associated with the autonomous vehicle;
generate a constellation of the plurality of sensors based on positions of the plurality of sensors in relation to the ideal chassis point;
minimize distortion between measured values associated with the constellation of the plurality of sensors and ideal values associated with the constellation of model sensors;
determine an estimated real chassis point based on the minimized distortion between the measured values and the ideal values; and
calibrate at least one of the plurality of sensors based on the estimated real chassis point.

20. The system of claim 19, wherein the measured values include distance values between the ideal chassis point and each of the plurality of sensors.

* * * * *